United States Patent [19]

Small

[11] Patent Number: 6,110,728
[45] Date of Patent: Aug. 29, 2000

[54] METHOD FOR REGENERATION OF ADSORPTIVE MATERIAL

[75] Inventor: Dorothy Small, Virginia Beach, Va.

[73] Assignee: Appropriate Innovative Technologies, Inc., Virginia Beach, Va.

[21] Appl. No.: 09/112,011

[22] Filed: Jul. 8, 1998

Related U.S. Application Data

[63] Continuation of application No. 08/701,959, Aug. 23, 1996, abandoned.
[60] Provisional application No. 60/002,814, Aug. 25, 1995.
[51] Int. Cl.$^7$ .................................................. D06M 16/00
[52] U.S. Cl. ............................................................. 435/264
[58] Field of Search ............................................... 435/264

[56] References Cited

U.S. PATENT DOCUMENTS

| | | | |
|---|---|---|---|
| 5,126,050 | 6/1992 | Irvine et al. | 210/615 |
| 5,589,004 | 12/1996 | Lashmett et al. | 134/10 |
| 5,597,728 | 1/1997 | Wyatt et al. | 435/262.5 |
| 5,656,490 | 8/1997 | Wyatt et al. | 435/281 |

FOREIGN PATENT DOCUMENTS 06198291 7/1994 Japan .

OTHER PUBLICATIONS

Dobrevski et al., Water Sci Technol 21(1): 141–143 (1989).
Ustinova et al., Khim. Tekhnol. Vody 8(6): 57–59 (1986). Abstract.
Perrotti et al., AIChE Symp. Ser. 70(144): 316–325 (1974). Abstract.
Ehrhardt et al., Appl Microbiol Biotechnol 21(1–2): 32–36 (1985).
Shirakashi et al., Hakkokogaku Kaishi 60(2): 87–92 (1983). Abstract.
Kuiryama et al., Hakkokogaku Kaishi 58(5): 385–390 (1980). Abstract.
Hutchinson et al., Water Res 24(10): 1209–1216 (1990).
Hutchinson et al., Water Res 24(20): 1217–1224 (1990).
Hutchinson et al., *Water Research* 24(1); p. 1209–1215 (1990).
Semmens et al., *Water Pollut. Control Fed.*, 49(12), pp. 2431–2444 (1977).

*Primary Examiner*—Jean C. Witz
*Attorney, Agent, or Firm*—Birch, Stewart, Kolasch & Birch, LLP

[57] ABSTRACT

A method for the regeneration of adsorption material which utilizes the biological activity of a consortium of microorganisms or a single strain of microorganisms. The method utilizes at least one chamber which may contain a variety of materials that adsorb undesirable organic and/or inorganic compounds. The method incorporates a cyclic method of active adsorption of undesirable compounds, sequentially performed with an active biological regeneration cycle. The biological process may have the characteristic of either aerobic, anaerobic, facilitative aerobic, or facilitative anaerobic microorganisms. As a result of the cyclic method of operation, the adsorption cycle maximizes the optimum efficiency of the adsorptive material. The method incorporates the use of a highly active bacterial inoculant that is customized to remove the undesirable-compounds from the adsorptive material.

3 Claims, 2 Drawing Sheets

METHOD FOR REGENERATION OF ADSORPTIVE MATERIAL

This application is a continuation of copending Application No. 08/701,959, filed on Aug. 23, 1996, the entire contents of which are; hereby incorporated by reference, application No. 08/701,959 claims priority on Provisional Application No. 60/002,814 filed on Aug. 25, 1995.

FIELD OF THE INVENTION

The present invention relates to the use of biological activity to remove materials that have been adsorbed onto an adsorbent such as activated carbon, as it is used in wastewater, groundwater, vapor and air treatments.

BACKGROUND OF THE INVENTION

Adsorptive materials such as carbon and other porous materials that act as an adsorptive surface are used to remove a wide variety of organic and inorganic compounds from water, vapor and air. Currently, these materials, once saturated, are disposed of at permitted landfills or returned to a processor that regenerates the material by chemical or thermal treatment. The landfill disposal of the exhausted materials is very expensive as well as environmentally questionable. Current techniques for the regeneration of adsorptive materials include chemical treatments such as acid washing and thermal treatments. These techniques may be used singularly or in combination with each other and are extremely expensive to use.

During the last 5–10 years the technique of using the adsorptive material as a fixed film bed has been developed and patented. The advantages are: lower cost of use of the adsorptive materials; unlimited life of the adsorptive material; and consumption of the contaminant compounds resulting in an environmentally correct approach. With fixed film beds, microorganisms are attached to the absorptive material. The microorganisms on the adsorptive material are contacted with a contaminant containing media for a sufficient period of time to allow the microorganisms to consume the contaminants. In fixed film beds, contaminants are removed from the media by the microorganisms rather than the adsorptive material, as is usually the case. However, the rate of consumption of contaminants by the microorganisms is not as fast as the adsorption rate of contaminants by the adsorptive material when it is used in its usual manner. The general approach to overcome this disadvantage is to increase the retention time of the undesirable compounds with the microorganisms. Two of the drawbacks of the fixed film bed are the extended retention time required for the microorganisms to reduce the contaminant concentration compared to the time required when adsorptive material is used directly and the fact that the microorganisms undergo a starvation period towards the end of the processing cycle during the time when the contaminant level is too low to be nutritionally sufficient for the microorganisms yet still too high to be considered environmentally safe.

SUMMARY OF THE INVENTION

The present invention relates to the equipment configuration and a method for regenerating adsorptive materials utilizing the biological activity of microorganisms. More specifically, the invention relates to the arrangement of equipment and the process of removing the undesirable compounds from the adsorptive material. The invention utilizes a high flow rate of a highly active microorganism inoculant to release and consume the undesirable compounds from adsorptive materials. The arrangement of the equipment may include one or many chambers that "house" or contain the adsorptive material.

The adsorptive material is loaded with the material to be treated up to the maximum tolerant level of the microorganism to be used, but not higher than the saturation point of the adsorbent material. Typically, the adsorptive material will be contacted with a liquid, gas or vapor containing contaminants until it is saturated or nearly saturated with contaminants. This is accomplished by passing the liquid, gas or vapor through the adsorptive material at the certain flow rate. The flow to each chamber may be upflow or downflow. The regeneration cycle is then started.

The regeneration cycle is started by draining the saturated adsorptive chamber or chambers if a liquid is being run through the adsorptive material. An inoculant that is maintained in a separate vessel is introduced into the chamber or chambers at a flow rate that utilizes the extracellular enzymatic activity of the microbial population to "attract" or remove the contaminants from the adsorptive material. The biological inoculant consumes the contaminants once they have been solubilized and removed from the adsorptive material. The arrangement and process includes one or more separate regeneration inoculants that may be maintained separately. It is possible that for some materials it may be necessary to perform the process using one type of inoculant or microorganism until the level of one or more contaminants is below a certain level and then use another inoculant or microorganism with the same adsorbent until the level of a different contaminant is below a certain level. The flow of the regenerating inoculant may be operated in counterflow or co-current flow.

The preferred regenerating inoculant contains a consortium of microorganisms that are selected based on the undesirable compounds that need to be removed from the adsorptive material. The compounds that must be removed are any and all compounds of interest that are adsorbed by the material including toxic materials and compounds that would interfere with the adsorbent capacity. The inoculant may contain aerobic, anaerobic, facilitative aerobic or facilitative anaerobic microorganisms. The inoculant also contains nutrients that are needed for optimum enzymatic activity. The addition of air is needed when aerobic microorganisms are utilized. This addition is done in the inoculant vessel. The inoculant may also contain other substances that aide in the solubilization of the compounds, such as surfactants. These compounds may be used when the activity rates of the microorganisms are not adversely affected by their addition. Instead of microorganisms, the inoculant may just contain the active enzyme or enzymes or may contain disrupted microorganisms or other preparations which contain active enzymes. The regenerating cycle is completed by draining the adsorption chamber or chambers of the inoculant.

DETAILED DESCRIPTION OF THE INVENTION

Figure 1:
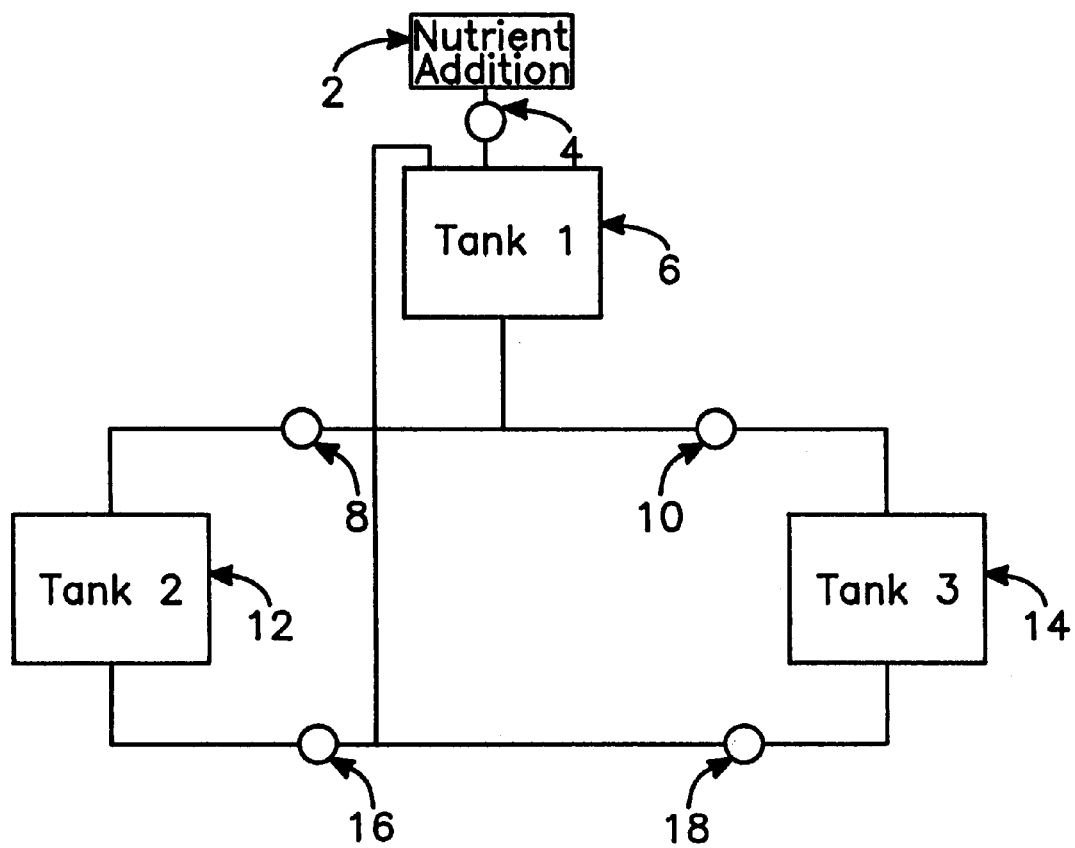
FIG. 1 is a flow diagram which represents the process that is preferred to carry out the process of this invention utilizing one or more (tank 1) seed tanks, one or more adsorbent beds (tanks 2 and 3), and means for regulating flow between the tanks.
Figure 2:
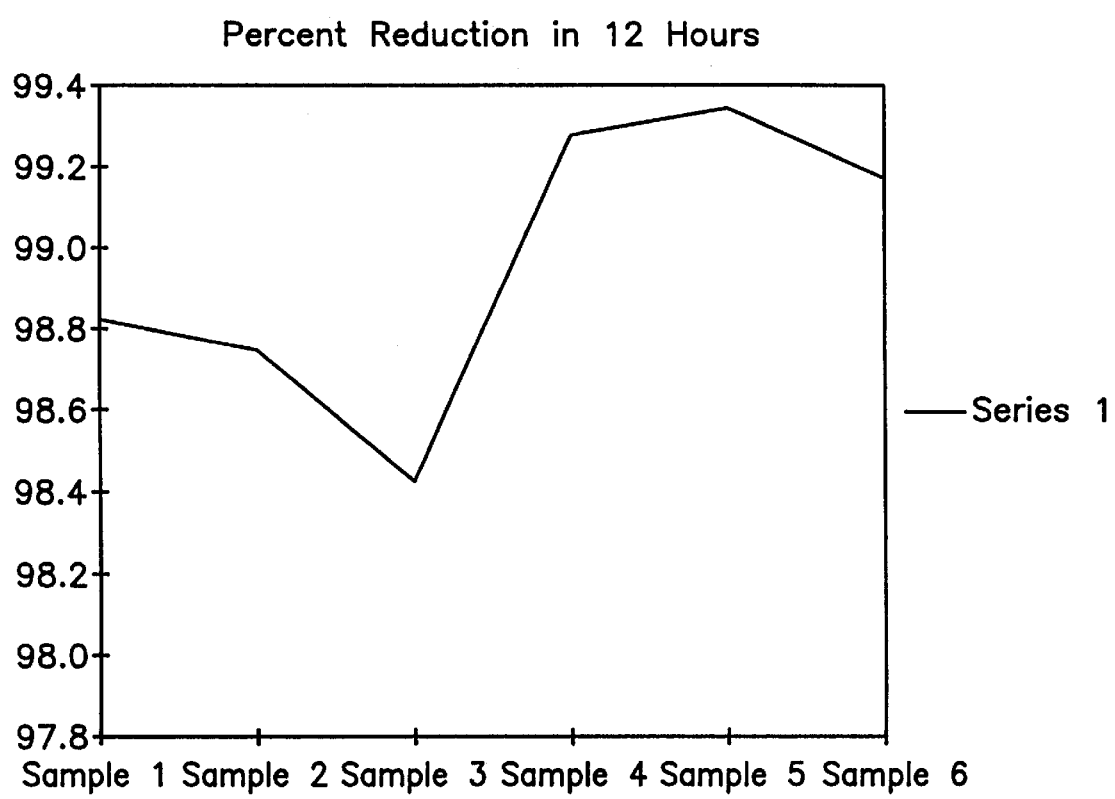
FIG. 2 is a graph showing the percent reduction of total petroleum hydrocarbons on the adsorptive material.

As shown in FIG. 1, the selected microorganisms are seeded into one or more tanks 6. If multiple species or strains of microorganisms are to be used, each strain or species may be maintained in a separate tank depending on the nutritional and growth requirements of that strain or species. Typical microorganisms which might be used include, but are not limited to, yeast, bacteria etc such as *Achrombacter, Rhodococcus, Aspergillus, Fusarium, Rhizopus, Chaetomium, Candida, Gloeoporus* and *Trichosporon*.

The nutrients for microorganisms typically include a nitrogen, phosphorus, and potassium solution at a diluted ratio of 5–15:0.2–5:1, preferably 10:1:1, based on total weight of nitrogen, phosphorous and potassium, delivered into tank 6 through a drip system from tank 2 which can be regulated by valve 4. The nutrients used are those which promote optimal growth for the microorganisms and the ratio of nitrogen, phosphorus and potassium may be varied as needed to give optimal growth.

If there is an insufficient energy source for the growth of the microorganisms, i.e. the contaminant concentration is too low to maintain prolonged growth or if the microorganisms will not be used to consume contaminants with a high enough frequency so as to maintain growth, an additional beginning energy source may be added. This energy (food) source is typically a complex carbohydrate such as corn starch or flour. If aerobic microorganisms are used, oxygen is added to tank 6 by active aeration through addition of air at a constant rate that maintains 2–6 ppm, preferably 2 ppm, dissolved oxygen concentration at all times.

The preferred size of tank 6 is 0.5–3 times the size of the adsorbent container (tank 12) and preferably tank 6 and tank 12 are of equal size. The preferred cell count of tank 1 should be $1.0 \times 10^6$ to $2.0 \times 10^8$ CFU, preferably $2.0 \times 10^8$ CFU before the regeneration process is begun.

When exposure of the adsorbent material in tank 12 to a contaminant containing liquid, gas or vapor (by conventional means, not shown) is complete, i.e. when the adsorbent material is saturated with contaminants, the stream which contains the contaminant may be switched to tank 14 which holds fresh adsorbent material, if more contaminants remain in the media, or simply drained if the contaminant level of the media has been reduced to an acceptable level. The flow from tank 6 to tank 12 is then opened by opening valve 8, and the inoculant is flowed through the adsorbent material at a flow rate which is 0.5–2 times the flow rate of the contaminant containing media that had been pumped through the adsorbent bed during the adsorption cycle. The inoculant removes the contaminant from the adsorbent material, and immediately begins consuming it. The microorganisms of the inoculant continue to consume the contaminant after this cyclic procedure is completed and the inoculant has been removed from tank 12. When the contaminants in the adsorbent material reach a concentration below 5% of the original concentration of the contaminant on the adsorptive material, the regenerative cycle is stopped and the inoculant is drained back into seed tank 6, returning tank 12 to operation whereby the regenerated adsorbent in tank 12 can again be used to remove contaminants from a contaminant containing liquid, gas or vapor. This cyclic process may take 8 hrs.–1 week, preferably 10–24 hrs., most preferably 12 hrs., depending on the contaminant load, the adsorptive material, the type of contaminant and the type and concentration of microorganism. The regeneration cycle can then be performed on the adsorptive material in tank 14 by closing valves 8 and 16 and opening valves 10 and 18 while the adsorptive material in tank 12 is removing contaminants from a liquid gas or vapor (by conventional means, not shown). When the adsorptive material in tank 12 is again saturated, the regeneration cycle can then be switched back to tank 12 while the adsorptive material in tank 14 is removing contaminants from a liquid, gas or vapor (by conventional means, not shown). This cyclic process can be continuously repeated. Liquids are transferred between containers by conventional pumps and transfer can be controlled by opening and closing valves 4, 8, 10, 16 and 18.

Contaminants which can be removed from adsorptive materials using the present invention include, but are not limited to, water soluble petroleum products such as jet fuel, gasoline, diesel fuel and kerosene; chlorinated solvents such as chlorobenzene, methylene chloride and trichloroethylene; non-halogenated solvents such as acetone, methylethyl ketone and methylisobutyl ketone; alcohols such as ethanol, methanol and isobutyl alcohol; and phenolic compounds such as those listed in Test Methods for Evaluating Solid Waste, Physical/Chemical Methods, SW-846m 3rd Edition, Proposed Update II—Nov. 1992, EPA SW-846 8270. This entire book is hereby incorporated by reference.

EXAMPLE

The following experiments were performed to demonstrate the removal of the contaminant from the adsorptive material.

I. Solution and Culture Preparation

Pseudomonas mixed cultures were acquired from Osprey Biotechnics Inc., Sarasota, Fla. The culture was aerobically grown in liquid suspension to a volume of 20 liters. The solution was "seeded" with 250 grams of bacteria. Each day, 50 grams of corn starch was added to increase cell count. Ammonium hydroxide was added to adjust the pH to 8.5 and deliver the nitrogen source for the bacteria. Phosphorus was initially delivered by adding phosphoric acid to the initial 20 liter solution. The cell count increased to $2.0 \times 10^8$ CFU after one week of growth. The Pseudomonas culture selected for this example was a 50/50 blend of Munox 212 and 512 to remove jet fuel saturated carbon. The selection of the microorganisms is entirely dependent on the contaminant that has been adsorbed onto the adsorbent material.

II. Initial Concentration of Contaminant

The initial concentration of the contaminant was determined by running analysis on samples of the adsorbent material (in this case activated carbon) that had been saturated with a saturated solution of jet fuel and water. The Total Petroleum Hydrocarbons were measured by method EPA SW-846 Modified 8015, which is hereby incorporated by reference. Six core samples were taken from six different locations in the column of the adsorbent material. The results are tabled below.

| Sample ID | Initial Concentration in mg/kg |
| --- | --- |
| Sample 1 | 33800 |
| Sample 2 | 30700 |
| Sample 3 | 25400 |
| Sample 4 | 23600 |
| Sample 5 | 16000 |
| Sample 6 | 12800 |

III. Results of the Concentration after Remesiation Cycle

The concentration of the contaminant was determined after 12 hours of the remediation cycle. The samples were taken from the same locations through the same sample sites. The samples were analyzed by method EPA SW-846 8015. The results are tabled below.

| Sample ID | Final Concentration in mg/kg |
|-----------|------------------------------|
| Sample 1  | 397                          |
| Sample 2  | 383                          |
| Sample 3  | 399                          |
| Sample 4  | 170                          |
| Sample 5  | 105                          |
| Sample 6  | 106                          |

It is important to note that the remedial cycle reduced the initial concentration of total Petroleum Hydrocarbons compounds by an average of 98% in 12 hours. This removal allows the adsorbent material to be reused to remove the contaminants without any other treatment.

It is also important to note that because of the continued flow rate of the inoculant through the adsorptive material the microorganisms are preferably not allowed to remain on the adsorptive material. As a result, the subsequent rate of adsorption of contaminants by the adsorptive material is not slowed down by the physical blocking of the adsorptive sites of the adsorptive material with microorganisms, as occurs in fixed film beds. The inoculant can be kept moving when it is in contact with the adsorbent material during the regeneration process by "continuously" recirculating the inoculant back through tank 6 and then back through the tank containing the adsorptive material. However, this specific recirculation set up is not necessary as long as the inoculant is kept moving while it is in contact with the adsorbent material.

Furthermore, the time in which the adsorptive material can be reused is dependent only on the rate at which the microorganisms withdraw the contaminants from the adsorptive material and not on the much slower rate of consumption of the contaminants by the microorganisms. As such, the microorganisms need only be in contact with the adsorptive material long enough to remove the contaminants. Actual consumption of the contaminants by the microorganisms can take place after the inoculant is drained back into tank 1, allowing the adsorptive material to be reused much more quickly.

In addition, since the level of contaminants in the adsorptive material need only be reduced by 95%, rather than the near 100% as with the film beds, the microorganisms are never subject to starvation conditions and can be maintained continuously as a healthy inoculant.

What is claimed is:

1. A method for the regeneration of adsorptive materials, comprising:

culturing one or more microorganisms selected from the group consisting of *Achrombacter, Rhodococcus, Aspergillus, Fusarium, Rhizopus, Chaetomium, Candida, Gloeoporus* and *Trichosporon* in a first vessel; and flowing said microorganisms into a second vessel containing a contaminated adsorptive material at a flow rate sufficient to prevent the microorganisms from remaining on the adsorptive material and for a time sufficient to regenerate said adsorptive material.

2. The method of claim 1, wherein said adsorptive material is one which adsorbs contaminants from air, liquid or vapor.

3. A method for regeneration of adsorptive material, comprising the steps of:

contacting an adsorptive material on which an undesirable material has been adsorbed with a solution containing microorganisms selected from the group consisting of *Achrorabacter, Rhodococcus, Aspergillus, Fusarium, Rhizopus, Chaetomium, Candida, Gloeoporus* and *Trichosporon* under flow conditions having a flow rate sufficient to prevent the microorganisms from remaining on the adsorptive material, until said undesirable material has been removed from said adsorptive material; and removing solution from said adsorptive material to produce a regenerated adsorptive material.

* * * * *